April 26, 1960  W. L. MATHER ET AL  2,934,072
PEA AND BEAN DEPODDING MACHINES
Filed Dec. 10, 1956  3 Sheets-Sheet 1
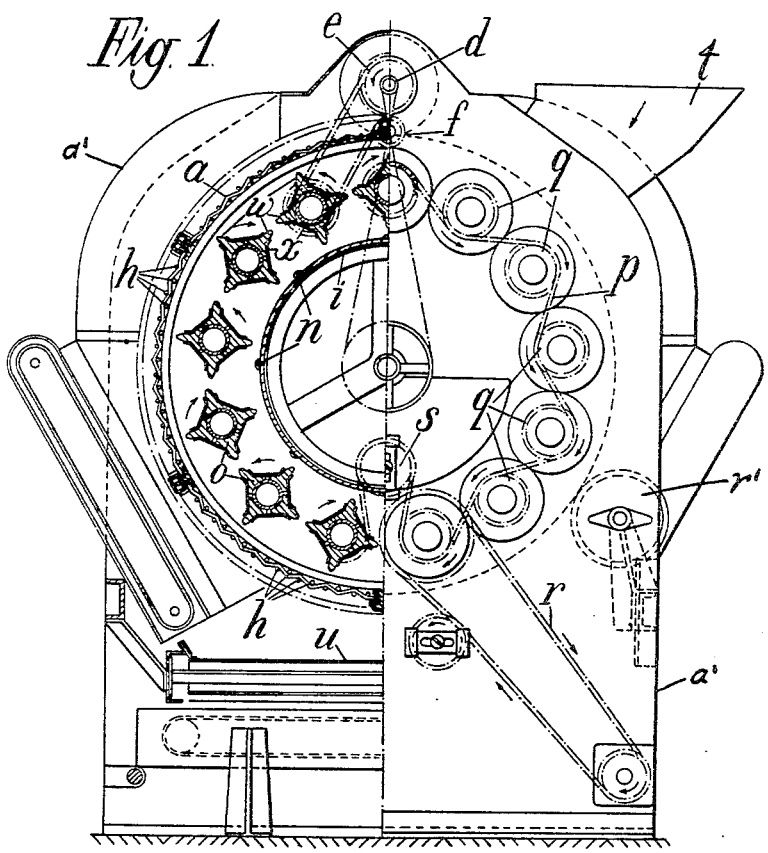
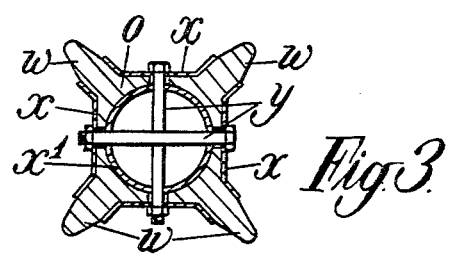
Inventors
W. L. Mather
H. Wolstenholme

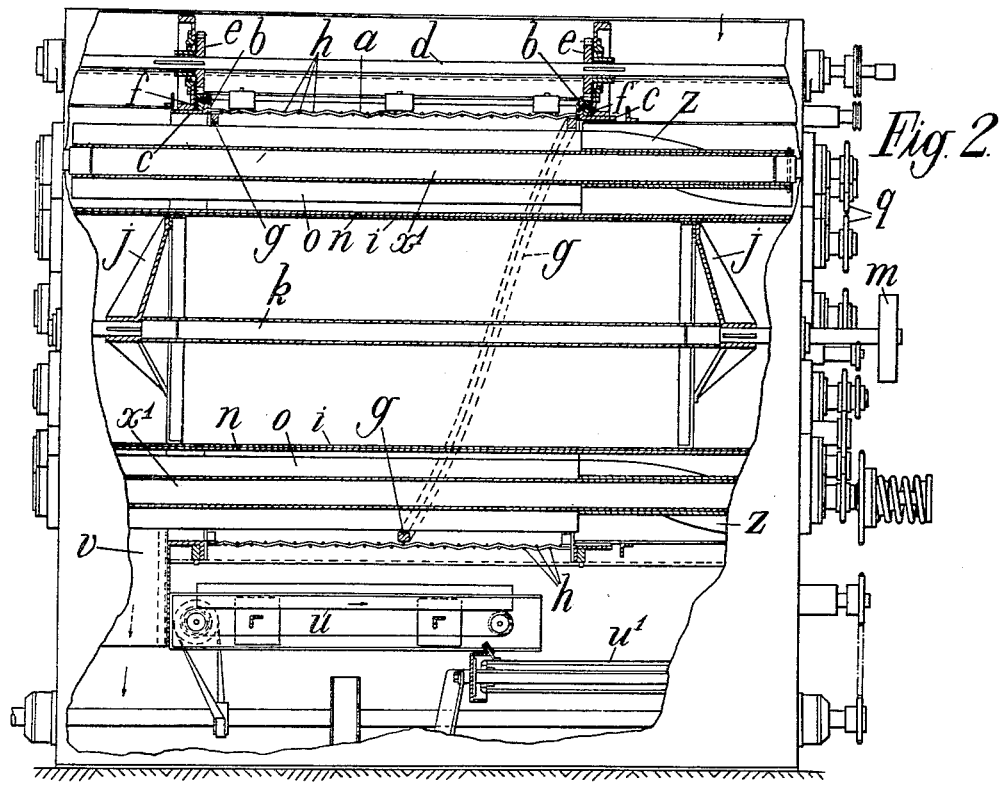

April 26, 1960  W. L. MATHER ET AL  2,934,072
PEA AND BEAN DEPODDING MACHINES
Filed Dec. 10, 1956  3 Sheets-Sheet 3
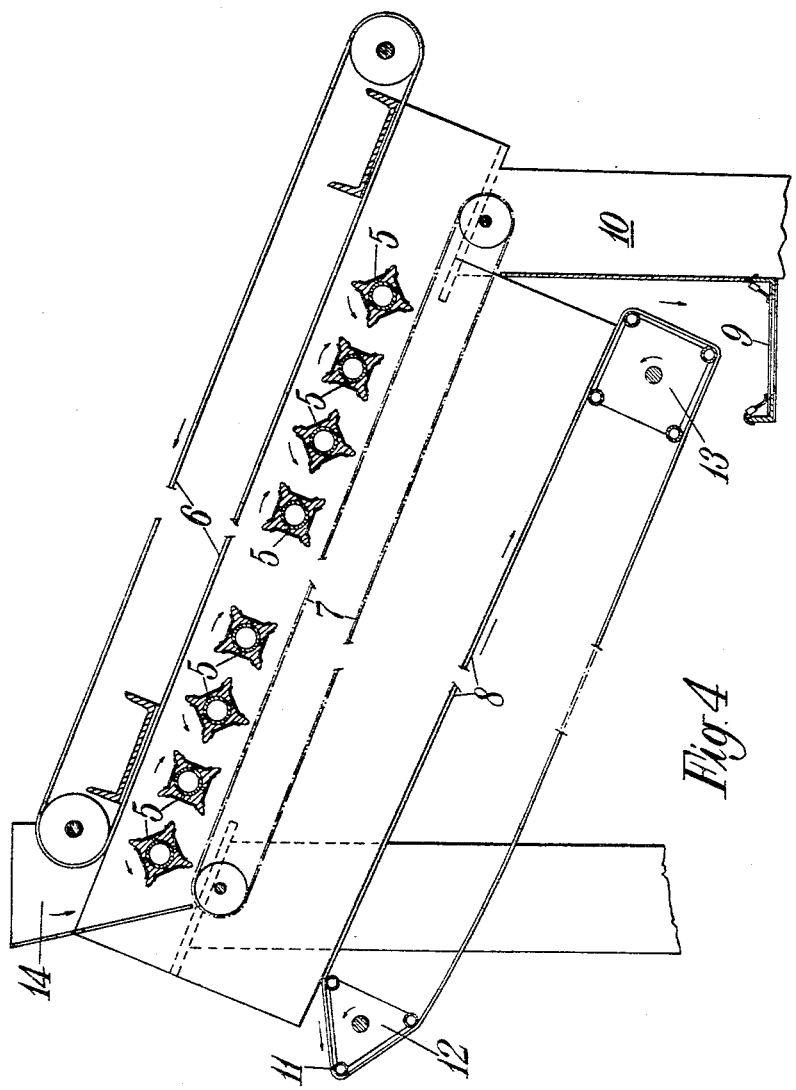

United States Patent Office 2,934,072
Patented Apr. 26, 1960

2,934,072

PEA AND BEAN DEPODDING MACHINES

William L. Mather, Macclesfield, and Harold Wolstenholme, Bolton, England, assignors to Mather & Platt Limited, Manchester, England, a British company Application December 10, 1956, Serial No. 627,394

3 Claims. (Cl. 130—30)

This invention relates to pea vining or pea and bean depodding machines hereinafter referred to as pea depodding machines, of the type in which the depodding is effected by rotary beaters.

The object of the present invention is to provide an improved machine which is more compact and so can readily be made mobile.

The invention consists in a pea depodding machine comprising a series of revolving beaters with adjacent beaters for the most part revolving in opposite directions, the beaters being disposed in the space between travelling or moving members, one of which has openings therein to allow separated peas to pass therethrough, the beaters projecting the pea vines substantially in alternation against the moving members which propel the vines and waste from beater to beater.

The invention further comprises a pea depodding machine as aforesaid in which the moving members are in the form of inner and outer co-axial revolving drums, the outer drum being perforated or having gaps therein for the passage of peas therethrough.

The invention further comprises a pea depodding machine as aforesaid in which the moving members are travelling endless belts, the lower belt being perforated or having apertures therein for the passage of peas therethrough.

The invention further comprises a pea depodding machine as aforesaid in which there are spiral blades on the beater shafts at the inlet end of the machine to propel the vine material into the path of the beaters between the inner and outer drums.

The invention further comprises a pea depodding machine as aforesaid in which each beater comprises a plurality of resilient strips extending longitudinally along the beater and having a projecting ridge thereon with means engaging the strips between the projecting ridges to secure such strips to the beater shaft. The projecting strips or ridges may be parallel to the axes of the beaters or at an angle thereto to form spirals.

The invention further comprises a pea depodding machine as aforesaid in which some or all of the beaters are driven by a common chain engaging sprocket wheels disposed on the beater shafts, the chain passing from the inside of one sprocket wheel to the outsides of adjacent sprocket wheels to cause adjacent beaters to revolve in opposite directions.

Referring to the accompanying explanatory drawings:

Fig. 1 is part elevation and part sectional elevation of a depodding machine constructed in one convenient form in accordance with the invention.

Fig. 2 is a sectional view taken at right angles to Figure 1.

Fig. 3 is a cross sectional view through a beater as used in the machine shown in Figs. 1 and 2.

Fig. 4 is a sectional view of a modified form of depodding machine constructed in accordance with this invention.

The machine illustrated in Figs. 1–3 comprises a housing $a'$ provided with an outer revolving drum $a$, which we term a riddle drum, and which consists of woven wire screens mounted at their ends on rings or annular members $b$ and $c$ by which the drum is supported as it is revolved from the shaft $d$ by gear wheels $e$ and $f$, the latter being secured to the annular flange members $c$ which are of angle iron section. The drum $a$ is further supported by means of rollers $r'$, as best seen in Fig. 1, which rollers bear on the flanges $c$ of the revolving drum $a$ and are spaced from each other on the underside of said revolving drum $a$. Since the left-hand portion of Fig. 1 is a sectional view, and for the sake of clarity, only one of said rollers has been illustrated. A spiral member $g$ fitted to the interior or inner wall of the riddle drum serves to propel the produce, which is being dealt with by the machine, longitudinally through the drum. The holes through the woven screens of the riddle drum may be about one inch square. Rods $h$ which form part of and give strength to the screens may be about ⅜″ diameter.

There is a telescopic central or inner revolving drum $i$ co-axially within the riddle drum $a$ and such inner drum is made of imperforate material, such as sheet metal. The drum $i$ is carried by members $j$ keyed to a shaft $k$ revolved by a pulley $m$. There are longitudinal bars $n$ extending along the outer surface of the inner drum $i$.

Between the riddle drum $a$ and the inner drum $i$, said respective drum means constituting travelling members, there is arranged a series of parallel revolving beaters $o$ which extend along the annular space between the two drums or travelling members. Such beaters are carried in suitable bearings in the walls of the machine housing $a'$ and are driven by a continuous chain drive $p$ engaging sprocket wheels $q$ on the beater shafts. As shown in Fig. 1, the driving chain $p$ passes from the inner side of one sprocket wheel to the outer sides of adjacent sprocket wheels in serpentine fashion so that adjacent beaters revolve in opposite directions. At the position where the chain $p$ is driven from a suitable power unit as by the chain $r$ in Fig. 1, the chain $p$ may pass over an intermediate adjustable sprocket wheel $s$ which results in the two beaters at the driving position revolving in the same circular direction.

Produce, that is the peas to be depodded are fed into the machine at inlet $t$. The peas after separation from their pods fall on to the conveyor $u$ and are delivered on to a further conveyor $u^1$ which delivers the peas where required. Waste material passes out of the machine at $v$, as best seen in Fig. 2.

Each beater as shown in Fig. 3 is built up from four strips $w$ of india-rubber or like plastic material, each strip having a part which projects from the base of the strip so that each beater comprises four longitudinally and radially projecting parts or ridges with plates $x$ extending between such projections, the plates being clamped in place by cross bolts $y$ extending through the tubular $x^1$ which carry the sprocket vessels $q$ at one end. It will be noted from Fig. 2 that at the feed or right hand end of the machine, there are spiral blades $z$ on the beater shafts $x^1$ and that the particular formation of the beaters with four resilient projecting parts extends from said spiral blades to the other end of the machine where the waste delivery point $v$ is situated.

The vines which are fed into the machine at one end are propelled by the spiral blades $z$ on the beater shafts $x^1$ into the annular space or chamber between the inner and outer revolving drums $a$ and $i$ respectively. They are then engaged by the beaters and due to the reverse rotary movements of adjacent beaters, the vines pass through the machine in a tortuous path. They are drawn between the beaters and propelled against the inner and outer drums in alternation which results in the depodding of the peas and, due to the rotation of the drums, the vines are fed from beater to beater and advanced through the machine to the outlet end *v* where the waste material is discharged. The spiral *g* on the inside wall of the riddle drum facilitates the lengthwise travel of the vines through the machine. The depodded peas pass through the riddle drum and fall on to the conveyor *u*.

The speed with which the product passes through the machine may be controlled by varying the speed of the inner and outer revolving drums relative to the speed of the beaters.

If the projecting ridges or strips *w* of the beaters are of spiral form, they will act to propel the vines through the machine so that the spiral members *g* can be dispensed with.

Due to the action of the beaters on the vines combined with the progressive movement of the materials through the machine *i*, a very efficient and rapid depodding of the peas is effected.

The drives to the inner and outer drums *i* and *a* are obtained as shown in Fig. 1 from one of the beater shafts, the two drums revolving in the same circular direction.

In the construction of the machine shown in Fig. 4, the beaters 5 which are similar in construction to those shown in Figs. 1 to 3, revolve in opposite directions between upper and lower belts 6 and 7 constituting travelling members which move in the same direction where they come adjacent to the beaters. The lower belt 7 is perforated and acts similar to the riddle drum *a* in Figs. 1–3 in allowing depodded peas to pass therethrough. Such peas drop on to the vibrating conveyor 8 from which the peas are delivered into the conveyor 9. Waste vine material passes down the chute 10. Any flat vine material which may pass on to the conveyor 8 will be carried upwards thereon and delivered at 11. The shapes of the parts 12 and 13 over which the conveyor 8 passes and by which it is driven, causes the conveyor to have a vibratory movement which facilitates the delivery therefrom of the peas which tend to roll down the conveyor. The vines are fed into the machine at 14. The drives to the belts 6 and 7, the beaters 5 and the parts 12 and 13 have been omitted for the sake of clearness. If desired, the beaters may be rotated at an increasing rate from the feed end 14 to the delivery end 10 of the machine.

It is to be understood that, although the invention has been described with specific reference to a few particular embodiments, it is not to be so limited since changes and alterations therein may be made which are within the scope of the present invention as defined by the appended claims.

What we claim is:

1. In a pea depodding machine for removing peas from their respective pods, the latter being carried on pea vines; in combination, a pair of travelling members spaced from each other a predetermined distance, respective rotatable beater means spaced from each other between said travelling members, respective rotatable shaft means connected to said respective beater means, the latter consisting of a plurality of resilient strips extending longitudinally of said respective rotatable shaft means and provided with projecting ridges, means engaging said resilient strips between said projecting ridges to thereby secure said strips to said respective rotatable shaft means, at least one of said travelling members being provided with apertures, said travelling members moving in the same direction at the place where the beaters are located between them, drive means cooperable with said respective beater means for imparting to substantially most of the adjacent beaters counter-rotating movement, whereby said pea vines are thrown in alternation against one and then the other of said pair of travelling members to thereby facilitate removal of said peas from their respective pods, said thus depodded-peas passing through said apertures remote from said respective beater means.

2. In a pea depodding machine according to claim 1, wherein said drive means include sprocket wheels carried on said respective rotatable shaft means, a common chain drive engageable with said sprocket wheels and passing from the inside of one sprocket wheel to the outside of an adjacent sprocket wheel, thereby imparting said counter-rotating movement to said adjacent beaters.

3. A pea depodding machine and the like comprising a housing provided with inlet and outlet means, coaxial arranged inner and outer rotating drum means disposed in said housing, said drum means being in telescopic relation with respect to each other to define an annular chamber therebetween, rotatable beater means located in said annular chamber, individual shaft means connected to said beater means, said inner and outer drum means moving in the same direction at the place where the beaters are located between them, said beater means comprising resilient strips extending longitudinally of said individual shaft means and provided with spirally shaped projecting ridges, and means for securing said resilient strips to said individual shaft means, drive means in registry with said individual shaft means to impart counter-rotating movement to adjacent beaters of said rotatable beater means, and means adjacent said inlet and carried by said individual shaft means to facilitate movement of pea vines into said annular chamber when said pea vines are received from said inlet means.

References Cited in the file of this patent

UNITED STATES PATENTS

| | | |
|---|---|---|
| 288,743 | Swingle | Nov. 20, 1883 |
| 2,137,093 | Monforts | Nov. 15, 1938 |
| 2,587,604 | Dauenhauer | Mar. 4, 1952 |

FOREIGN PATENTS

| | | |
|---|---|---|
| 442,051 | Germany | Mar. 21, 1927 |